H. KLEB.
FERTILIZER POT.
APPLICATION FILED APR. 18, 1921.
1,424,829.    Patented Aug. 8, 1922.
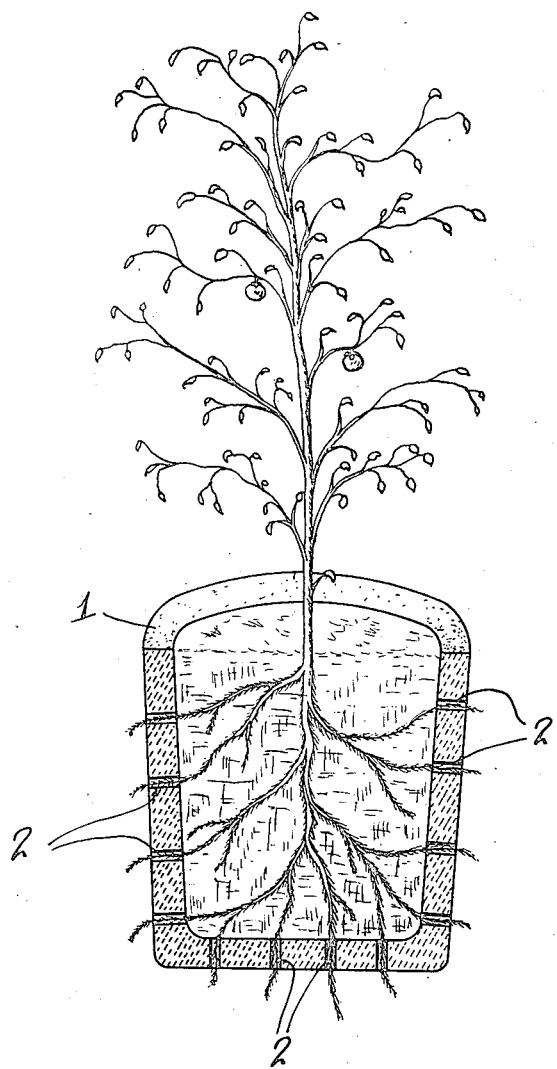
Inventor
Henry Kleb
By
Attorney

UNITED STATES PATENT OFFICE.

HENRY KLEB, OF ELIZABETH, NEW JERSEY.

FERTILIZER POT.

1,424,829.  Specification of Letters Patent.  Patented Aug. 8, 1922.

Application filed April 18, 1921. Serial No. 462,221.

*To all whom it may concern:*

Be it known that I, HENRY KLEB, a citizen of the United States of America, residing at 441 Court Street, Elizabeth, Union County, State of New Jersey, have invented a new and useful fertilizer pot and the method of producing a fertilizer pot whose object is to act as a seed bed and fertilizer for plants and to eliminate the usual process of transplanting.

A further object of the invention is to provide a fertilizer pot adapted to constitute means whereby the transplanting may take place without the accompanying shock to which the plant is subjected under the usual method of severing the tender roots of the plant from the seed bed in the process of transplantation.

A further object of the invention is to provide means whereby the growth of the plant roots may proceed without being materially interrupted, and to provide a fertilizer pot which while sufficiently porous to permit small roots to find their way through the wall of the pot, may and preferably will be provided with slots or apertures in its side to permit the free passage of growing roots.

A further object of the invention is to supply plants with fertilizing agents during the period of germination and growth and to provide a fertilizer pot adapted when placed in the ground to dissolve in a period from two to three weeks so that roots will then take their permanent hold in the garden soil.

It is also an object of the invention to provide a fertilizer pot adapted to produce healthier and stronger plants and reduce the period of maturity by four to six weeks, and increase the crop from 10 per cent to 25 per cent.

The figure of the drawing is a sectional perspective view of a fertilizer pot constructed in accordance with this invention.

Referring to the drawing, 1 designates a fertilizer pot or receptacle provided at intervals with slots or openings 2 for the passage of roots of a plant or plants to permit the roots to reach the surrounding soil before the fertilizer pot or receptacle has been decomposed by the soil.

The composition used in making the decomposing fertilizer pot consists of the following ingredients:—

| Ingredient | Per cent. |
|---|---|
| Cow manure | 25 |
| Horse manure | 12.5 |
| Corn fertilizer | 2.5 |
| Nitrate of soda | 1 |
| Guano | .25 |
| Hair | .0625 |
| Straw | .0625 |
| Ground hoof | 3.5 |
| Ground bone | 2.5 |
| Hemp | .0625 |
| Flax | .0625 |
| Sand | 10 |
| Clay | 8.5 |
| Earth | 18.75 |
| Moss | 2.5 |
| Wood | .25 |
| Ashes | 2.5 |
| Compost | 10 |

The materials are intimately mixed, and by adding water in proper proportion a paste is formed permitting the compound to be placed into molds.

The resulting fertilizer pots are subjected to an ordinary drying process to retard decomposition.

In employing this method germination and growth of the plant life is practically uninterrupted from the time of planting the seed until maturity of the plant.

I am aware of the fact that the materials mentioned have been used for fertilizing purposes, but I do maintain that they have never before been used and mixed together to produce a porous paste, which when formed into receptacles, will serve as a seed bed and fertilizer.

What is claimed is:—

1. A fertilizer pot or receptacle consisting of plant nourishing materials and a porous binding material.

2. A fertilizer pot or receptacle consisting of plant nourishing materials and a porous binding and reinforcing material.

In testimony whereof I have hereunto set my hand.

HENRY KLEB.